(12) United States Patent
Herrmann et al.

(10) Patent No.: US 11,201,376 B2
(45) Date of Patent: Dec. 14, 2021

(54) MULTILAYER CERAMIC SOLID ELECTROLYTE SEPARATOR WITH PLASTIC REINFORCEMENT FOR INCREASING THE FRACTURE STABILITY AND REDUCING SHORT CIRCUITS IN ELECTRIC BATTERIES

(71) Applicants: Volkswagen AG, Wolfsburg (DE); AUDI AG, Ingolstadt (DE); Dr. Ing. h.c. F. Porsche AG, Stuttgart (DE)

(72) Inventors: Mirko Herrmann, Mountain View, CA (US); Angela Speidel, Wolfsburg (DE)

(73) Assignees: VOLKSWAGEN AG, Wolfsburg (DE); AUDI AG, Ingolstadt (DE); DR. ING. H.C.F. PORSCHE AG, Stuttgart (DE)

( * ) Notice: Subject to any disclaimer, the term of this patent is extended or adjusted under 35 U.S.C. 154(b) by 122 days.

(21) Appl. No.: 16/125,907

(22) Filed: Sep. 10, 2018

(65) Prior Publication Data
US 2020/0083509 A1 Mar. 12, 2020

(51) Int. Cl.
| | |
|---|---|
| *H01M 50/449* | (2021.01) |
| *H01M 4/38* | (2006.01) |
| *H01M 10/052* | (2010.01) |
| *H01M 10/0562* | (2010.01) |
| *H01M 10/0565* | (2010.01) |

(Continued)

(52) U.S. Cl.
CPC ......... *H01M 50/449* (2021.01); *H01M 4/382* (2013.01); *H01M 10/052* (2013.01); *H01M 10/0562* (2013.01); *H01M 10/0565* (2013.01); *H01M 10/0585* (2013.01); *H01M 50/411* (2021.01); *H01M 50/431* (2021.01); *H01M 2300/0074* (2013.01);

(Continued)

(58) Field of Classification Search
CPC .. H01M 2/145; H01M 2/1646; H01M 2/1653; H01M 2/1686; H01M 10/052; H01M 10/0562; H01M 10/0565; H01M 10/0566; H01M 10/0585; H01M 2300/0074; H01M 2300/0085; H01M 2300/0094
See application file for complete search history.

(56) References Cited

U.S. PATENT DOCUMENTS

| | | | | |
|---|---|---|---|---|
| 5,714,278 A | * | 2/1998 | Mallinson | ........... H01M 50/463 429/126 |
| 6,355,379 B1 | | 3/2002 | Oshita et al. | |

(Continued)

FOREIGN PATENT DOCUMENTS

| | | |
|---|---|---|
| DE | 102010030197 | 12/2011 |
| DE | 102013112015 | 4/2015 |

(Continued)

*Primary Examiner* — Brittany L Raymond
(74) *Attorney, Agent, or Firm* — Davidson, Davidson & Kappel, LLC (57) ABSTRACT

A separator for an electric battery includes a first solid electrolyte layer; a plastic separator film impregnated with a liquid or gel electrolyte; and a second solid electrolyte layer, the first and second electrolyte layers sealing the liquid or gel electrolyte in the plastic separator. Also disclosed is a separator where first and second electrolyte layers sealing a plastic separator film and have a porosity less than 5%. A method for manufacturing a separator, an electric battery and a vehicle are also provided.

7 Claims, 11 Drawing Sheets

(51) Int. Cl.
*H01M 10/0585* (2010.01)
*H01M 50/411* (2021.01)
*H01M 50/431* (2021.01)

(52) U.S. Cl.
CPC ............... *H01M 2300/0082* (2013.01); *H01M 2300/0085* (2013.01); *H01M 2300/0094* (2013.01)

(56) References Cited

U.S. PATENT DOCUMENTS

| | | | | |
|---|---|---|---|---|
| 2011/0177383 | A1* | 7/2011 | Culver | H01M 10/0413 429/160 |
| 2013/0266842 | A1* | 10/2013 | Woehrle | H01M 10/056 429/144 |
| 2014/0072860 | A1 | 3/2014 | Inauen | |
| 2015/0079485 | A1 | 3/2015 | Choi et al. | |
| 2016/0240831 | A1* | 8/2016 | Zeng | H01M 2/1686 |
| 2018/0026302 | A1 | 1/2018 | Kumar et al. | |
| 2019/0260066 | A1* | 8/2019 | Hu | H01M 4/131 |

FOREIGN PATENT DOCUMENTS

| | | |
|---|---|---|
| DE | 102014211058 | 12/2015 |
| DE | 102015224948 | 6/2017 |
| EP | 3032611 | 6/2016 |

\* cited by examiner

MULTILAYER CERAMIC SOLID ELECTROLYTE SEPARATOR WITH PLASTIC REINFORCEMENT FOR INCREASING THE FRACTURE STABILITY AND REDUCING SHORT CIRCUITS IN ELECTRIC BATTERIES

The present invention relates generally to electric batteries, and more particularly to electric batteries with solid electrolyte separators, and to separators having solid electrolytes.

BACKGROUND

In a conventional lithium-ion battery, a liquid electrolyte or gelled liquid electrolyte is used, and the separator is made of a porous/perforated plastic film generally composed of the materials polyethylene (PE) and polypropylene (PP). The plastic separator is flexible, but porous, which can lead to dendrite growth.

U.S. Patent Publication No. 2013/0266842 discloses a lithium-ion battery. In one embodiment the separator has a layer system composed of two inorganic solid-state electrolyte layers which conduct lithium ions and a polymer layer. In particular, the polymer layer is provided on both sides with an inorganic solid-state electrolyte layer which conducts lithium ions. In this way, the "breakthrough reliability" or the mechanical puncture resistance can advantageously be increased further. The inorganic solid-state electrolyte layer can, in particular, be ceramic. The '842 publication states that the expression "inorganic solid-state electrolyte which conducts lithium ions" does not encompass an inorganic solid whose material itself does not conduct lithium ions and contains, for example, a liquid which conducts lithium ions or a polymer which conducts lithium ions. The polymer layer can, for example, be a polyolefin-based polymer layer. Furthermore, the polymer layer can be porous. The porosity of polymer layers can advantageously be set in a defined manner in a simple way, for example by means of a stretching process. The polymer layer can also conduct lithium ions. The polymer layer preferably does not conduct electrons. For example, the polymer layer can have a layer thickness of from ≥1 µm to ≤100 µm, for example from ≥10 µm to ≤40 µm, for example about 25 µm.

The '842 publication states that the inorganic solid-state electrolyte layer which conducts lithium ions can, in particular, be ceramic, and states the at least one inorganic solid-state electrolyte layer which conducts lithium ions can have a porosity, in particular an open porosity, of from ≥5% to ≤90%, for example from ≥25% to ≤75%, for example about 50%.

The '842 publication further states that the separator can be produced by coating the polymer layer with the inorganic solid-state electrolyte layer which conducts or by coating an inorganic solid-state electrolyte layer which conducts lithium ions with a polymer layer. As an alternative thereto or in addition thereto, the negative electrode and/or the positive electrode, in particular the positive electrode, can be coated with the inorganic solid-state electrolyte layer or with the polymer layer.

SUMMARY OF THE INVENTION

A lithium-ion battery with a pure ceramic separator in a defect-free state can prevent the growth of dendrites. Although thin ceramic separators do have a certain flexibility, they are not as flexible as a plastic film, and have a certain susceptibility to breakage. At the present time it is difficult to manufacture very thin (<50 µm), defect-free ceramic solid electrolyte separators.

The solution provided by the '842 publication also is not optimal in terms of performance or preventing formation of defects, or in terms of manufacturing or cost efficiency.

The present invention thus provides a separator for an electric battery comprising:

a first solid electrolyte layer;

a plastic separator film impregnated with a liquid or gel electrolyte; and a second solid electrolyte layer, the first and second electrolyte layers sealing the liquid or gel electrolyte in the plastic separator.

The present invention thus allows mechanical reinforcement of a solid electrolyte layer such as a ceramic separator, with a porous/perforated plastic film, as well as formation of a multilayer ceramic separator/solid electrolyte and plastic impregnated separator layers as a composite.

The separator thus can function somewhat similarly to bulletproof glass or laminated glass in automobile windows, in which fragile glass panes are processed, with the aid of a tear-resistant film, to form a multilayer glass pane-film composite.

However, as opposed to bulletproof glass, the present invention can use an impregnated lithium ion-conductive film such as a porous separator to protect the solid electrolyte. At temperatures >60° C., a porous separator using liquid electrolyte or gel electrolyte is very advantageous as it can enable use of conventional and inexpensive plastic separators, where the plastic material itself does not conduct lithium ions. Since the liquid/gel electrolyte of the present invention is shielded from metallic lithium by at least one layer of the solid electrolyte, reaction of liquid/gel electrolyte with the metallic lithium can be prevented.

The first and second electrolyte layers advantageously can be made of lithium oxide or sulfide glasses or glass ceramics or ceramics, preferably having a porosity of less than 5%, i.e. from zero to less than 5%. This low porosity can help prevent any through-holes, which could allow leakage of the gel or liquid electrolyte sealed by the electrolyte layers.

The present invention also provides a separator for an electric battery comprising:

a first solid electrolyte layer;

a plastic separator film; and a second solid electrolyte layer, the first and second electrolyte layers sealing the plastic separator film and having a porosity less than 5%.

Thus, even if no gel or electrolyte is used with the plastic separator film, for example by using a PEO (polyethylene oxide) film, the present invention can provide protection of the plastic separator film, while the plastic separator film supports and strengthens the solid electrolyte layers. Since lithium-ion conducting polymer films can become rather soft or experience gellification at higher temperatures, the use of sealing electrolyte layers with low porosity can be advantageous.

In addition, the low porosity layers are highly advantageous with conventional plastic separator films that do not conduct lithium ions but instead are wetted or impregnated with a gel or liquid electrolyte.

The present invention also provides a method for manufacturing a separator comprising:

gluing or laminating a first solid electrolyte layer onto a porous plastic separator.

The use of gluing or laminating of the first solid electrolyte layer onto the porous plastic separator can provide a good seal not possible by coating methods used with porous polymer films, and can allow for wetting the plastic separator with gel or liquid electrolytes that cannot pass through the solid electrolyte layer.

The method thus may further comprise wetting the porous plastic separator film with a liquid or gel electrolyte; and placing a second ceramic solid electrolyte layer onto a second side of the porous plastic separator wetted with the liquid or gel electrolyte.

The porous plastic separator thus can be glued or laminated, dry, onto a ceramic solid electrolyte. The plastic separator is wetted with a gel electrolyte, and a second ceramic solid electrolyte is placed on the gel electrolyte to create a solid electrolyte/plastic separator-gel electrolyte/solid electrolyte (SPGS) unit. This SPGS unit may then be combined with other SPGS units to form a multilayer, plastic-reinforced solid electrolyte composite.

The present invention also provides an electric battery comprising a cathode layer, a separator according to the invention disclosed above, an anode layer and a current collector.

A significant advantage of the present invention is that it allows use of a metallic lithium layer as an anode, since the solid electrolyte layer separates the metallic lithium from the porous polymer. Pure metallic lithium has a higher reactivity than intercalated lithium used for example in the '842 publication. A pure metallic lithium layer or plated metallic lithium from a carbon/graphite-based anode could be used to provide the metallic lithium.

The present invention thus also provides an electric battery comprising an anode layer including a metallic lithium; and a separator for an electric battery including a first solid electrolyte layer contacting the anode layer; and a plastic separator film connected to the first solid electrolyte layer opposite the anode layer.

The present invention further provides an electric or hybrid vehicle comprising the electric battery.

DETAILED DESCRIPTION

Figure 1:
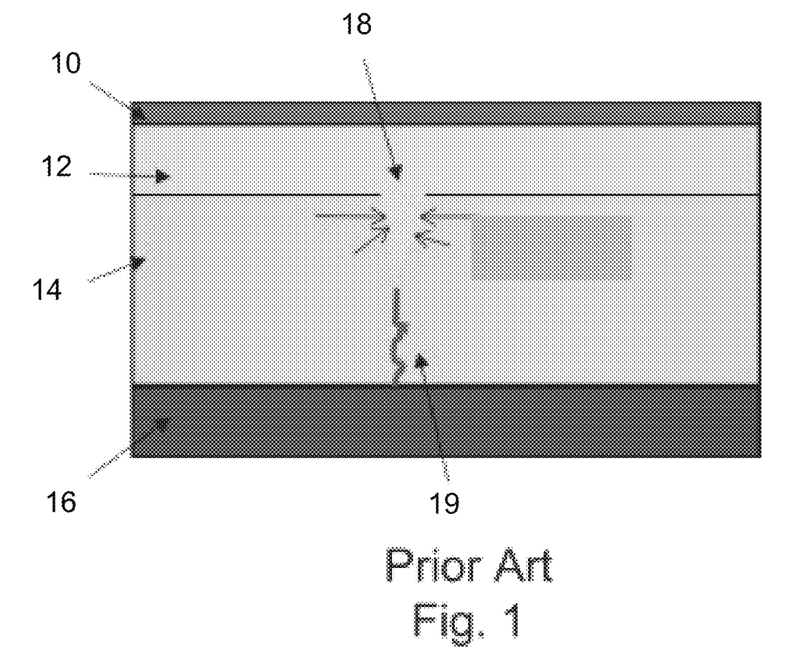
FIG. 1 shows a prior art battery cell with a ceramic solid electrolyte separator developing a defect.

FIG. 1 shows a prior art lithium-ion battery cell with a copper current collector 10 having a thickness of 8 to 12 micrometers, an anode layer 12 having a thickness of 20 to 40 micrometers, a ceramic solid electrolyte separator 14 having a thickness of 18 to 25 micrometers and a cathode layer 16 having a thickness of 60 to 120 micrometers.

Charging and discharging of the battery cell creates an enormous amount of stress on a surface of the solid electrolyte and the stress increases with the number of surface defects such as small dents, grooves, cracks, or depressions, and with a decrease in temperature. Although lithium is a soft metal, below 60° C. it is does not flow well. When lithium metal accumulates in a depression during charging and fills the space, the next amount of lithium presses the previously deposited lithium away from the solid electrolyte. Depending on the geometry, the situation may arise that the force to move the lithium layer further is not directed away from the solid electrolyte, but instead is directed laterally against it, as shown at depression 18. As a result, the ceramic solid electrolyte can breaks and has a rupture 19, as shown in FIG. 1.

The continuous rupture causes dendrite growth through the separator, and short circuits the cell. This may also result in the rupture developing transversely through the solid electrolyte surface, thus dividing the solid electrolyte into multiple fragments. These fragments are displaced due to vibrations of the vehicle, and the current collector films are cut by sharp-edged fragments.

Figure 2A:
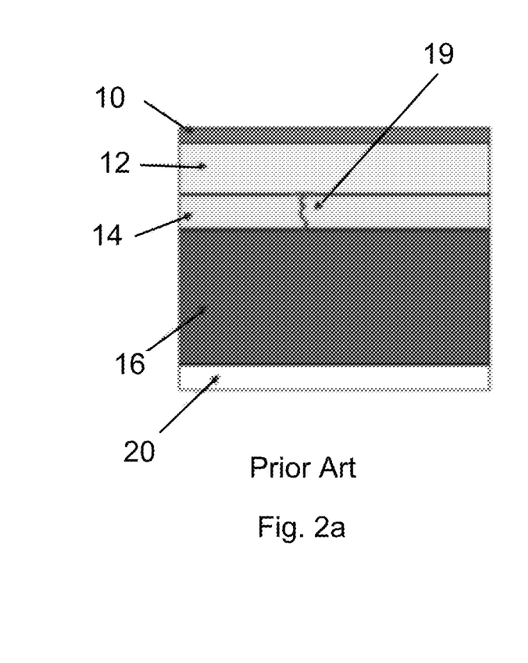
FIGS. 2a, 2b and 2c show the prior art battery cell of FIG. 1 and the progression of the defect in the battery cell.
Figure 2B:
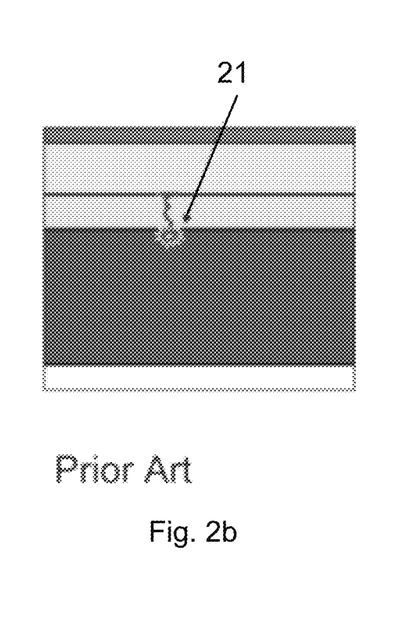
Figure 2C:
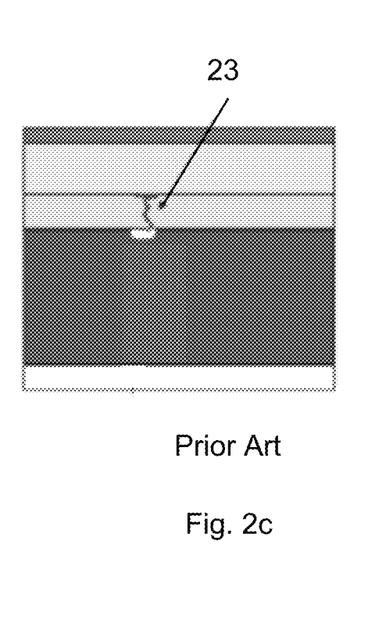

FIGS. 2a, 2b and 2c show a possible defect progression in a battery cell with a ceramic separator as in FIG. 1, and having an aluminum current collector 20 with a thickness of 12 to 30 micrometers. If the rupture 19 or dendrite grows through the solid electrolyte layer 14 between the anode layer 12 and cathode layer 16, as shown in FIG. 2a, this can short circuit these layers as shown schematically in FIG. 2b. After the short circuit, the dendrite 19 remains in the solid electrolyte layer 14 and at the anode layer 12, even if the lithium were to melt. This melted state shortens local short circuit events enormously, and could even establish a permanent connection between the anode and the cathode. As the result of excessive heating, the cathode material could ignite or be damaged as shown in FIG. 2c at damage area 23, or the lithium in the solid electrolyte could possibly evaporate and cause the solid electrolyte to burst in places.

Figure 3A:
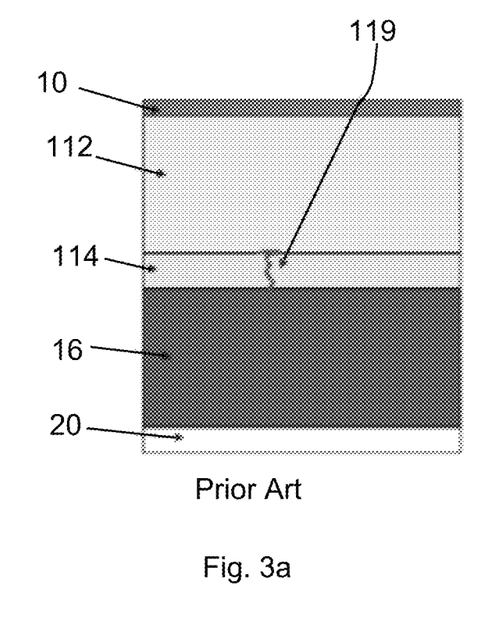
FIGS. 3a, 3b, 3c show a prior art battery cell with a conventional plastic film with liquid or gel electrolyte and the progression of a defect in the battery cell.
Figure 3B:
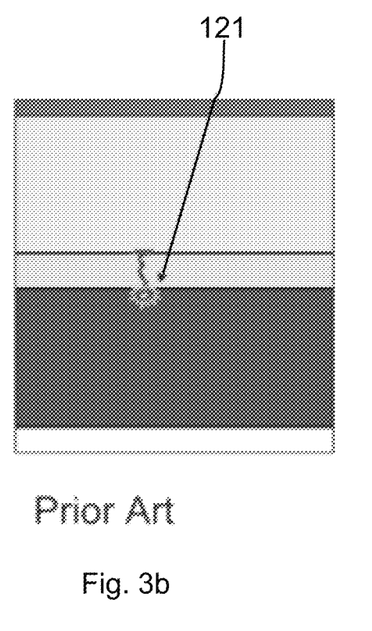
Figure 3C:
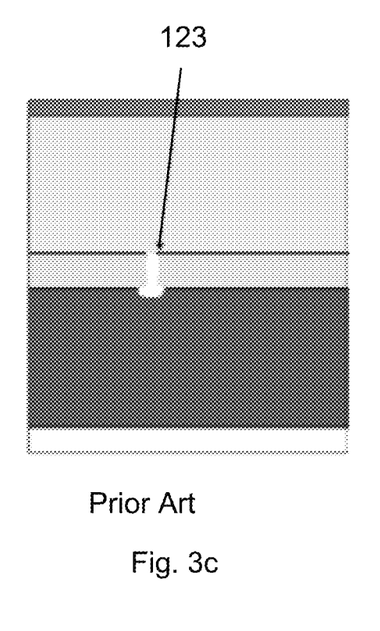
Figure 4:
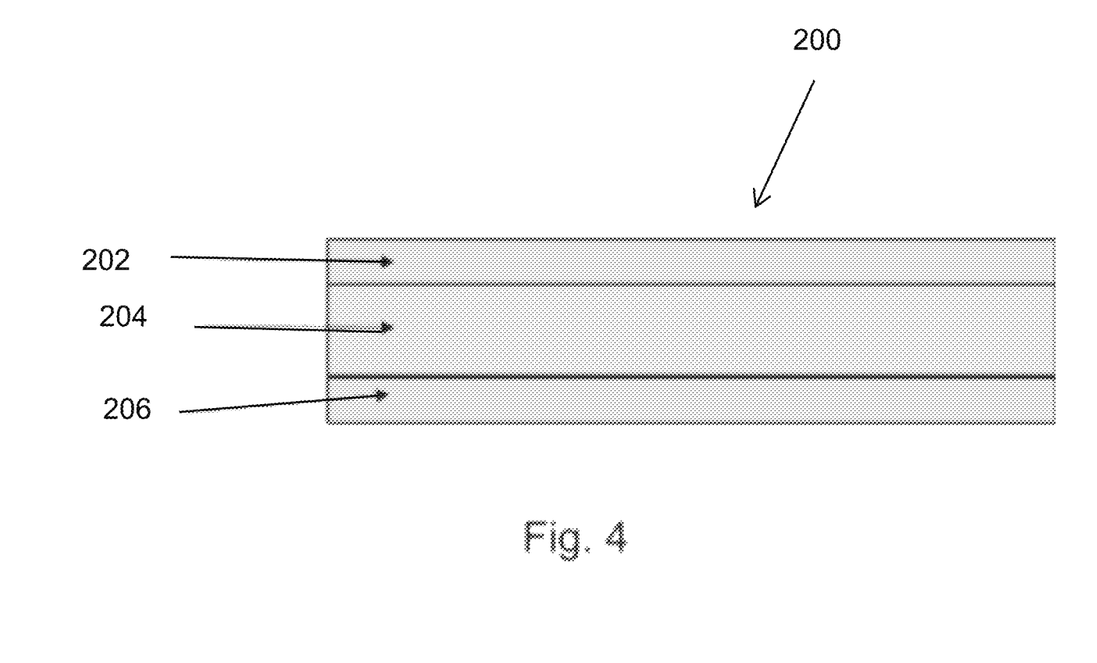
FIG. 4 shows a schematic of the multi-layer separator of the present invention.

Conventional plastic separators with electrolyte or gels do not face the exact same problem, but also experience defects. FIGS. 3a, 3b, 3c show a prior art battery cell with a conventional plastic film with liquid or gel electrolyte and the progression of a defect in the battery cell. The conventional battery cell is similar to the cell shown in FIG. 2a, but with a thicker anode layer 112 of 50 to 100 micrometers, and a porous plastic separator 114 of 18 to 25 micrometers having a liquid or gel electrolyte. The dendrite growth in conventional separator 114 is intensified by lower temperatures >0° C. and fast charging >1 C. During charging, the dendrite 119 grows through the plastic separator 114 from the anode layer 112, and contacts the cathode layer 16, resulting in a short circuit. Dendrite 119 has a good connection on the anode layer 112 and a fairly low contact resistance. In comparison, the dendrite 119 end establishing the contact with cathode layer 16 has a higher contact resistance. Since the same current flows through both ends, the different contact resistances result in different rates of heating. There is a greater drop in potential at the high contact resistance, which, multiplied by the short circuit current, results in a greater heating loss and damage to the cathode layer 116 at this location 121, as shown in FIG. 3b. Depending on the size of the dendrite 119 and the magnitude of the charging current, this may result in the dendrite evaporating or melting down, and melting a hole 123 in the separator 114. Polyethylene and/or polypropylene, having a melting temperature of 120° C. to 140° C., are generally used. The porous nature of the plastic separator results in deformations, even below the melting temperature. Cell openings of conventional lithium-ion cells with a porous plastic separator have sometimes exhibited holes having diameters of 0.5 mm to 5 mm in the plastic separator, resulting in poorer performance of the battery cell FIG. 4 shows a schematic of a preferred embodiment of the multi-layer separator 200 of the present invention. A first solid electrolyte layer 202 of 2 to 15 micrometer thickness, a porous plastic separator film layer 204 of 18 to 25 micrometer thickness impregnated with a liquid or gel electrolyte, and a second solid electrolyte layer 204 of 2 to 15 micrometer thickness.

The first and second electrolyte layers 202, 206 are made of lithium oxide or sulfide glasses or glass ceramics or ceramics, and have a porosity of less than 5%, i.e. from zero to less than 5%. The low porosity layers 202, 206 thus do not have through-holes, and seal the gel or liquid electrolyte in the porous plastic separator film layer 204. The porous plastic separator film layer 204 can have a porosity of for example in a range of 25 to 75%, and more preferably from 30 to 60%.

Mechanical reinforcement of the thin solid electrolyte layers 202, 204, which are for example made of ceramic, with a porous/perforated plastic film 204 increases the rupture strength and prevents displacement of possible sharp-edged fragments in the event that a rupture occurs. Without the reinforcement film 204, the surface of the solid electrolyte 202, 204 must be virtually perfect.

First solid electrolyte layer 202 can have a layer thickness 0.5 μm to 50 μm, and can aid in separation of the cathode side from the metallic lithium anode or plated metallic lithium from a carbon/graphite based anode. Metallic lithium is very reactive, and reacts with the components of the liquid/gel electrolyte; the reaction speed and the resulting heat of reaction increase dramatically during a short circuit and heating of the cell. Conventional lithium-ion batteries containing liquid electrolytes and metallic lithium have often ignited or even exploded in laptops, due to dendrites. The first solid electrolyte layer 202 can aid in preventing such issues, and the use of metallic lithium is an advantage of the present invention. However, intercalated lithium also can be used as an anode in less preferred embodiments.

Porous plastic separator layer 204 can help provide mechanical reinforcement of the first solid electrolyte layer 202, and increases the rupture strength and fixes possible fragments of the solid electrolyte layer 202 to the separator layer 204.

For lithium-ion conductivity, plastic separator 204 itself preferably is not lithium ion conductive but rather preferably is impregnated with a liquid/gel electrolyte. A gelled liquid electrolyte is preferably used, which on the one hand has the task of transporting the lithium ions through the plastic separator 204, and on the other hand cushions the mechanical stress on the second solid electrolyte 204.

However, in some less preferable embodiments, a plastic separator 204 made for example of lithium-ion conductive plastic material such as PEO can be used.

Second solid electrolyte layer 206 can be similar to the first electrolyte layer 202, and also can be thinner, for example from thicknesses ranging from 0.5 μm to 20 μm and made of ceramic.

Figure 5:
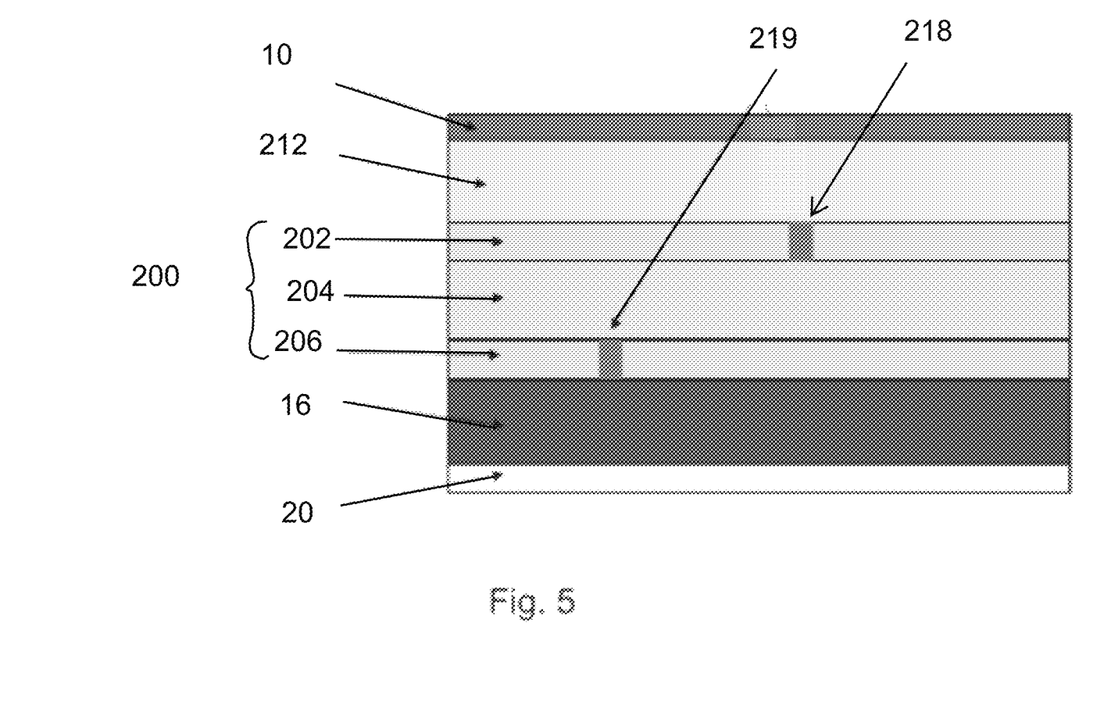
FIG. 5 shows a battery cell of the present invention, with possible defects.

FIG. 5 shows a battery cell of the present invention, with possible defects 218, 219.

The battery cell has a current collector 10, for example a copper foil of 8 to 12 micrometer thickness, and anode layer 212 of for example pure metallic lithium with a preferred thickness of 20 to 40 micrometers, separator 200 as described in FIG. 4, a cathode layer 16 with a preferred thickness of 60 to 120 micrometers and made for example of lithium metal oxides such as lithium nickel-manganese-cobalt oxide ("NMC") mixed with a binder and electric conductive material, and a current collector 20 made for example of aluminum foil with a thickness of 12 to 30 micrometers. The battery cell defines an SPGS unit.

The multilayer structure assists the SPGS unit in dealing with defects, as shown in FIGS. 6, 7, 8 and 9.

Figure 6:
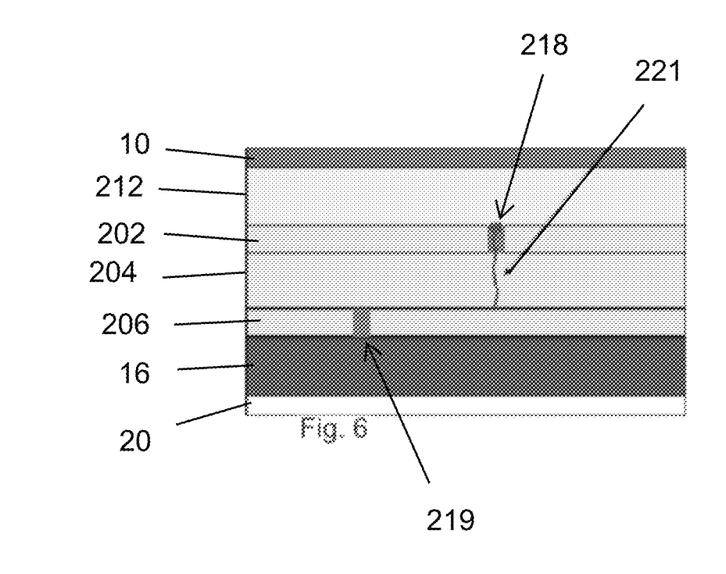
FIG. 6 shows the battery cell of the present invention with a first progression of a defect.

As shown in FIG. 6, a dendrite 221 may grow from defect 218 in first solid electrolyte layer 202 through the plastic separator layer 204. However, any defect 219 in solid electrolyte layer 206 is not likely to be at the exact same location, and thus the dendrite 221 is blocked at layer 206.

Figure 7:
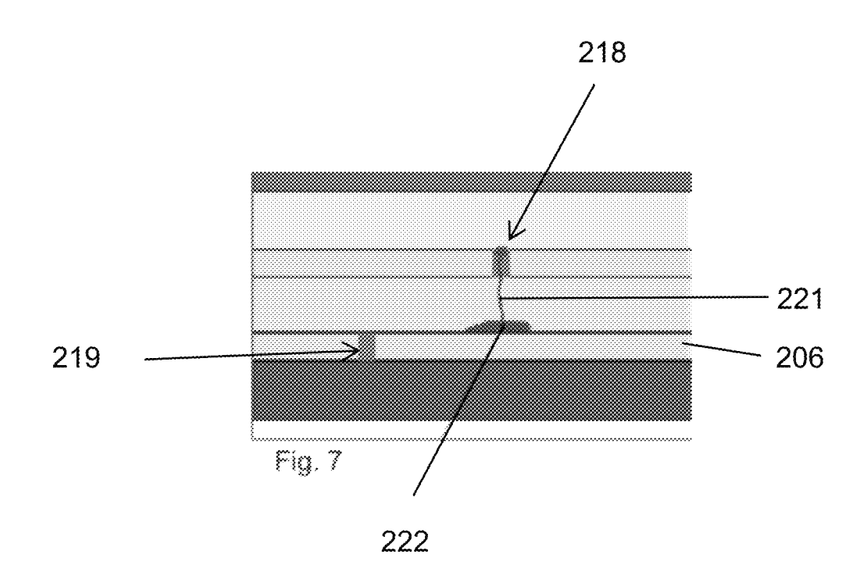
FIG. 7 shows the battery cell of the present invention with a further progression of the defect.
Figure 8:
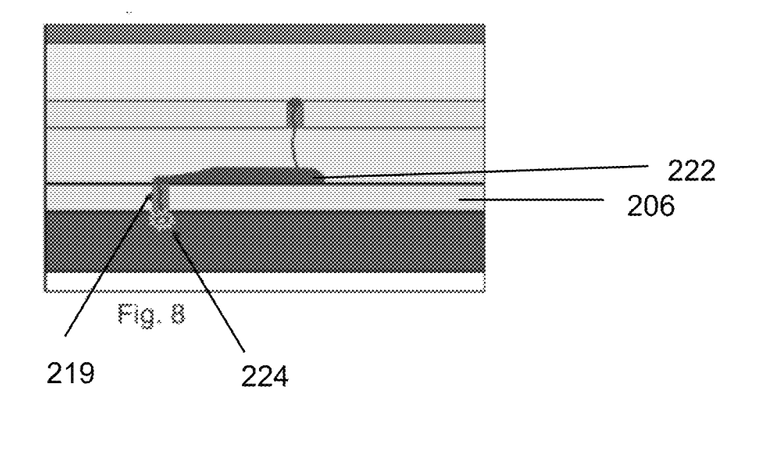
FIG. 8 shows the battery cell of the present invention with a yet further progression of the defect.

As use of the battery cell continues, lithium can pass through dendrite 221, but will collect on the nonporous second electrolyte layer 206 due to the sealing function of the second electrolyte layer 206, as shown in FIG. 7.

Figure 9:
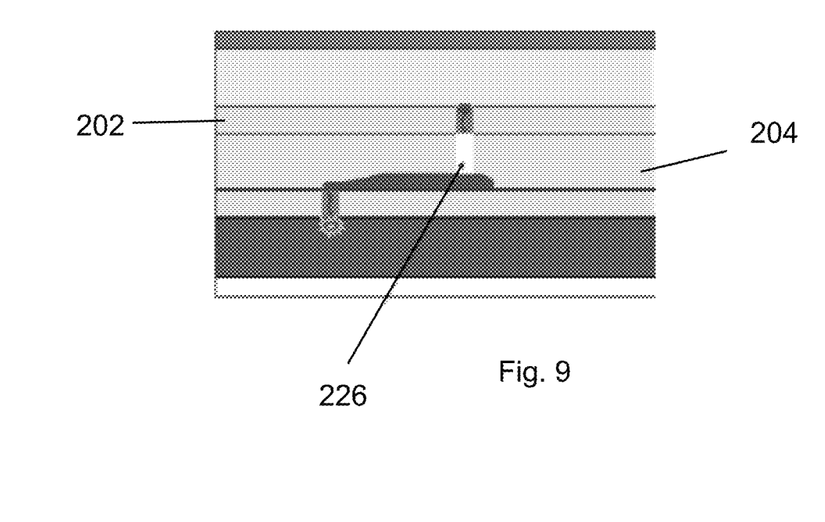
FIG. 9 shows the battery cell of the present invention with a still further progression of the defect.

Even if the lithium reaches defect 219 in second electrolyte layer 206, and a short circuit results at 224, the SPGS unit can still function, albeit with some reduced functionality, since the plastic separator material will melt as shown in FIG. 9 and form a hole 226. Hole 226 in the plastic separator 204 also reduces the likelihood that a dendrite connection will form once again at this location. Dendrite growth is retarded at this location as dendrite growth competes with the dendrite degradation during discharging. The dendrite degradation is accelerated during slow discharging (<0.5 C) and at temperatures above 0° C.

Second solid electrolyte 206 and the SPGS unit construction thus reduces the likelihood of a short circuit event enormously due to stochastic distribution of surface defects. For the first solid electrolyte 202, a metallic lithium film forms on the entire surface of the solid electrolyte; i.e., all open pores, grooves, notches, depressions, dents, and gaps are necessarily filled with lithium. If these defects have an unfavorable size and geometry, crack formation occurs. However, the further plastic separator 204 and second solid electrolyte layer 206 reduce the negative effects of such crack formation.

Figure 10:
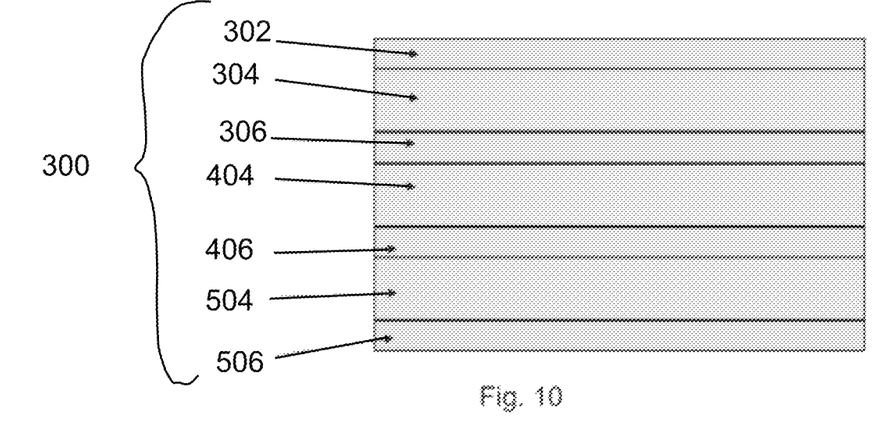
FIG. 10 shows the battery of the present invention with several cells.

FIG. 10 shows a further embodiment of a separator 30 in which SPGS units may be further combined into multilayer units to form a SPGS unit composite of several plastic separator layers 304, 404, 504 similar to layer 204. Solid electrolyte layers 302, 306, 406, 506 may be similar to layers 202 and 206 and have for example a thickness of 2 to 15 micrometers.

In the embodiments above, for quick processing, the dry plastic separator is glued or laminated onto a rear side of a solid electrolyte layer. The plastic separator can then be wetted with gel or liquid to form layers 204, 304, 404, 504, and the next solid electrolyte later added to seal the gel or liquid.

Figure 11:
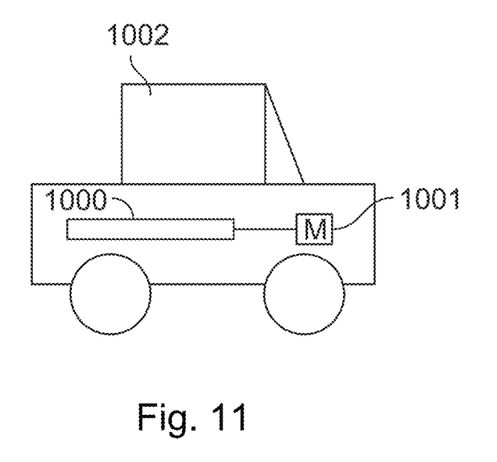
FIG. 11 shows an electric or hybrid vehicle with the battery of the present invention.

As shown schematically in FIG. 11, in one application, the battery cells can be formed used in a battery 1000 providing power as an electric battery to an electric motor 1001 for powering an electric or hybrid vehicle 1002.

What is claimed is:

1. A method for manufacturing a separator comprising:
   gluing or laminating a first solid electrolyte layer directly onto a first side of a porous plastic separator having a porosity of 25 to 75%;
   wetting the porous plastic separator film with a liquid or gel electrolyte after the gluing or laminating the first solid electrolyte layer directly onto the first side of the porous plastic separator; and
   placing a second solid electrolyte layer onto a second side of the porous plastic separator wetted with the liquid or gel electrolyte.

2. The method as recited in claim 1 wherein the first and second solid electrolyte layers seal the liquid or gel electrolyte in the plastic separator.

3. The method as recited in claim 1 wherein the porous plastic separator is made of a porous polyethylene or polypropylene film.

4. The method as recited in claim 1 wherein the porous plastic separator is a non-lithium ion conducting film.

5. The method as recited in claim 1 wherein the first solid electrolyte layer is made of a material selected from a group consisting of lithium oxide, sulfide glasses, glass ceramics and ceramics.

6. The method as recited in claim 1 wherein the first solid electrolyte layer has a porosity of less than 5%.

7. The method as recited in claim 1 wherein the first solid electrolyte layer is devoid of through-holes.

* * * * *